Dec. 30, 1952

G. TURRINELLI 2,624,037

DEVICE FOR CONVERTING A DIRECT CURRENT HAVING A CONSTANT
VOLTAGE INTO A DIRECT CURRENT HAVING A VARIABLE VOLTAGE

Filed April 21, 1950

Patented Dec. 30, 1952

2,624,037

UNITED STATES PATENT OFFICE 2,624,037

DEVICE FOR CONVERTING A DIRECT CURRENT HAVING A CONSTANT VOLTAGE INTO A DIRECT CURRENT HAVING A VARIABLE VOLTAGE

Gino Turrinelli, Milan, Italy

Application April 21, 1950, Serial No. 157,374
In Italy April 23, 1949

4 Claims. (Cl. 323—11)

1

The present invention relates to a device for converting a direct current having a constant voltage into a direct current having a variable voltage.

It is an object of the present invention to provide an arrangement to supply energy from a direct current source at a predetermined voltage—for example from an electric traction line of 600 v.—to a line varying a current having a variable voltage varying from zero to a maximum.

This object is attained by means of two armatures mechanically rigidly connected with each other and rotating in two fields excited separately, said armatures being electrically connected with each other.

The invention is hereinafter described and shown in the drawings in which Figures 1, 2, 3 and 4 illustrate four different conditions of a device according to the invention.

Switches 1 and 2 connect the device to the constant voltage line and the switches 11 and 12 connect the same to the variable voltage circuit.

Figure 3:
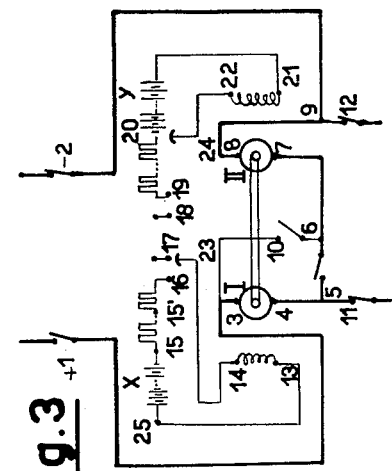
Fig. 3 shows the circuit arrangement when the voltage of the variable voltage circuit has become equal to the voltage of the constant voltage line.

The circuits of excitation of the two machines I and II are fed separately from the voltage of two small storage batteries marked "$x$" and "$y$" in the figures and adjusted by the two resistors 15, 15', 16, 17 and 18, 19, 20', 20 which are connected to the windings 13, 14 and 21, 22, respectively, by means of two slide contacts 23 and 24.

It should be understood that in practice the two batteries "$x$" and "$y$" may be replaced by any source of energy having a voltage maintained constant within a minimum. In the embodiment shown in Figures 1 to 4, this source is constituted by the cells of a storage battery, the voltage of which may be kept variable for each cell from a minimum limit of 2 volts to a maximum of 2.7 volts.

2

From said source, electric current is fed so as to bring the currents of excitation of the two fields 13, 14 and 21, 22 at will from zero flux to the flux corresponding to the maximum intensity of the current of excitation admissible in view of the nature of the windings 13, 14 and 21, 22 and vice versa.

On starting operation of the device, the excitation 13, 14 is at its maximum because by means of contact 23 maximum current intensity is caused about in the circuit 15, 25, 13, 14, 23, whilst excitation in the field 21, 22 is zero since the contact 24 is at on the point 18 so that the circuit 18, 19, 20, 21, 22, 24 is broken between 18 and 19.

Under these conditions, closing of the switch 5, 6 causes the current coming from the positive terminal 1 of the mains, to returns to the negative terminal of the mains through the closed switch 2. As the armature I is in the field 13, 14 excited at maximum, it will start rotating and taking along with it the armature II which is mechanically coupled with the armature I. While the armature I generates a counter-electromotive force equal to the voltage of the main assuming a speed of $n$ turns per minute, the armature II moving in a zero field, and thus will not generate any counter-electromotive force: therefore, betwen the points 11 and 12, which are the positive and negative terminals of the variable voltage circuit, the voltage is zero, and between the points 1 and 5 the voltage is the line voltage. If the slide contact 23 is shifted on the resistor 15, 16, 17 bringing it, for example, to position 15, and simultaneously the slide contact 24 is shifted on the resistors 18, 19, 20 so as to bring it to position 20', the current of excitation between 13 and 14 is decreased and the current of excitation between 21 and 22 is decreased. Thus the intensity of the magnetic field, in which armature I rotates, will diminish, and the intensity of the magnetic field, in which armature II rotates, will increase. It is easy to arrange the resistors and the displacement of the two contacts on 15' and 20' in such a manner that the flux acting upon the armature of I and the flux acting upon the armature of II, do not cause an appreciable variation of the rotating speed of the two armatures. In any case, however, the counter-electromotive forces of the two machines I and II are charging as functions of this speed. If the resistors 15, 16, 17 and 18, 19, 20 are properly dimensioned and the displacements of the two movable contacts 23 and 24 are suitably connected so as to proceed with contact 23 from 15 to 17 and with contact 24 from 18 to 20, a gradual variation of the counter-electromotive force of the machine I is obtained from the line voltage to zero voltage, and of the machine II from zero voltage to line voltage.

With other words, while between the points 1 and 4 the voltage varies from line voltage to zero, between the points 5 and 9 i. e. the points at which the variable voltage circuit is branched off, the voltage varies from zero to line voltage.

A current will thus be obtained between 11 and 12, said current having a voltage variable from zero to line voltage. The steps of the variable voltage will correspond to the steps of the resistors 15, 16, 17 and 18, 19, 20. The speed of rotation of the system constituted by the two rotors of I and II can be easily kept uniform by the simultaneous displacements of the movable contact 23 from 15 toward 17 and of the movable contact 24 from 18 toward 20.

If the displacement is completed, the circuit of Fig. 3 is obtained in which no excitation of field at I is obtained, so that the armature I does not generate any counter-electromotive force; therefore, between 1 and 5 there is no appreciable voltage drop besides the one due to the negligible ohmic resistance of the circuit. Between the points 7 and 8 (and, therefore, also between 5 and 9 or between 11 and 12) the voltage is equal to the line voltage.

The armature II is thus energized by the line voltage and has a field with full excitation; it runs as an idle motor and takes the idle armature of I along.

An increase of line voltage to double its value can be obtained with the following operations:

(a) Closing the switch 6, 10, provided for this purpose, and opening the switch 5, 6. Operation of these switches in the said order takes place without any sparking, as the difference of potential between 5 and 10 is zero and the current absorbed by the machine II, which acts as an idle motor, is minimum.

Figure 4:
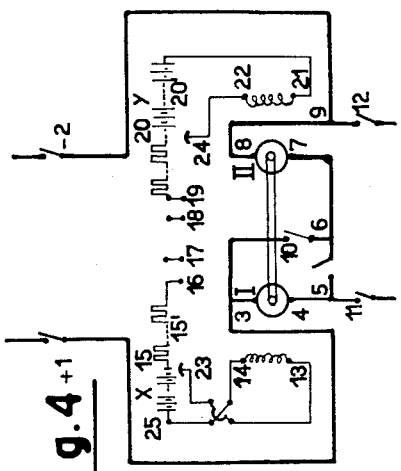
Fig. 4 shows the circuit arrangement when the variable voltage is increased with respect to the constant voltage, the machine I acting as a voltage booster actuated by the machine II.
Figure 1:
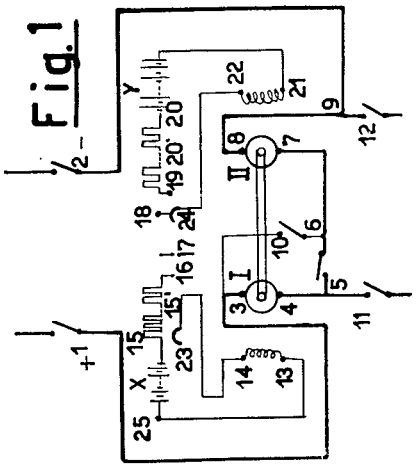
Fig. 1 shows the circuit arrangement at the start of the operation of the device, i. e., when the variable voltage circuit is at zero voltage and the flux of the machine I corresponds to the saturated field, while the flux in machine II is zero.
Figure 2:
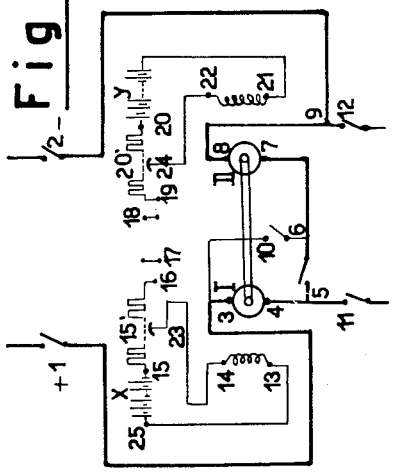
Fig. 2 shows the circuit arrangement at a stage where the voltage of variable voltage circuit is determined by the different intensities of the flux in the two machines I and II as obtained by varying the exciting currents.

(b) Reversing the connections 25, 13 and 23, 14 so as to obtain the connections of Fig. 4, viz. 23, 13; 25, 14.

(c) Then gradually displacing the movable contact 23 from 17 toward 15 so as to obtain the circuit arrangement of Fig. 4.

In this condition, the machine II acts as a motor relative to the connected machine I, in which the flux intensity increased from zero to saturation, will induce an electromotive force increased from zero to line voltage.

This electromotive force will add to the line voltage so that at points 11 and 12, which by effect of the preceding operations already has reached line voltage, a voltage gradually growing from line voltage to the double of line voltage will be obtained.

From the terminals 11 and 12, the positive negative terminal of the variable voltage circuit, currents may then be branched off, which are rapidly variable in voltage and in intensity.

Having now particularly described and ascertained the nature of my said invention and in what manner the same is to be performed, I declare that what I claim is:

1. A device for converting a direct current having a constant voltage into a direct current having a variable voltage, comprising in combination, a first direct current machine having a first armature having a first terminal and a second terminal; a first field winding forming part of the first machine; a second direct current machine having a second armature mechanically coupled with said first armature so that said first and second armatures form a unit rotating as a whole, said second armature having a first terminal and a second terminal; a second field winding forming part of said second machine; an electrical connection connecting said second terminal of said first armature to said second terminal of said second armature; a circuit branching off from said second terminal of said first armature and said first terminal of said second armature so as to be connected in shunt to said electrical connection and said second armature; means for connecting the direct current having a constant voltage to the first terminals of said first armature and said second armature; first controllable means for exciting said first field winding, said first controllable means including a first contact connected to a terminal of said first field winding; second controllable means for exciting said second field winding, said second controllable means including a second contact connected to a terminal of said second field winding; and means for mechanically coupling said contacts to each other so as to simultaneously increase the excitation of the first field winding and decrease the excitation of the second field winding and vice versa, whereby said circuit carries a direct current having a variable voltage and a power substantially equal to that of the direct current having a constant voltage.

2. A device for converting a direct current having a constant voltage into a direct current having a variable voltage, comprising in combination, a first direct current machine having a first armature having a first terminal and a second terminal; a first field winding forming part of the first machine; a second direct current machine having a second armature mechanically coupled with said first armature so that said first and second armatures form a unit rotating as a whole, said second armature having a first terminal and a second terminal; a second field winding forming part of said second machine; an electrical connection connecting said second terminal of said first armature to said second terminal of said second armature; a circuit branching off from said second terminal of said first armature and said first terminal of said second armature so as to be connected in shunt to said electrical connection and said second armature; means for connecting the direct current having a constant voltage to the first terminals of said first armature and said second armature; first controllable means for exciting said first field winding, said first controllable means including a first contact connected to a terminal of said first field winding; second controllable means for exciting said second field winding, said second controllable means including a second contact connected to a terminal of said second field winding; means for mechanically coupling said contacts to each other so as to simultaneously increase the excitation of the first field winding and decrease the excitation of the second field winding and vice versa, whereby said circuit carries a direct current having a variable voltage and a power substantially equal to that of the direct current having a constant voltage; and means for reversing the connection of said first field winding and said controllable means exciting the same, whereby said circuit is enabled to feed back power to the device.

3. A device for converting a direct current having a constant voltage into a direct current having a variable voltage, comprising in combination, a first direct current machine having a first armature having a first terminal and a second terminal; a first field winding forming part of the first machine; a second direct current machine having a second armature mechanically coupled with said first armature so that said first and second armatures form a unit rotating as a whole, said second armature having a first terminal and a second terminal; a second field winding forming part of said second machine; an electrical connection connecting said second terminal of said first armature to said second terminal of said second armature; a first switch for interrupting said electrical connection; a second switch shunting said first armature and said first switch; a circuit branching off from said second terminal of said first armature and said first terminal of said second armature so as to be connected in shunt to said electrical connection and said second armature; means for connecting the direct current having a constant voltage to the first terminals of said first armature and said second armature; first controllable means for exciting said first field winding, said first controllable means including a first contact connected to a terminal of said first field winding; second controllable means for exciting said second field winding, said second controllable means including a second contact connected to a terminal of said second field winding; and means for mechanically coupling said contacts to each other so as to simultaneously increase the excitation of the first field winding and decrease the excitation of the second field winding and vice versa, whereby said circuit carries a direct current having a variable voltage and a power substantially equal to that of the direct current having a constant voltage.

4. A device for converting a direct current having a constant voltage into a direct current having a variable voltage, comprising in combination, a first direct current machine having a first armature having a first terminal and a second terminal; a first field winding forming part of the first machine; a second direct current machine having a second armature mechanically coupled with said first armature so that said first and second armatures form a unit rotating as a whole, said second armature having a first terminal and a second terminal; a second field winding forming part of said second machine; an electrical connection connecting said second terminal of said first armature to said second terminal of said second armature; a first switch for interrupting said electrical connection; a second switch shunting said first armature and said first switch; a circuit branching off from said second terminal of said first armature and said first terminal of said second armature so as to be connected in shunt to said electrical connection and said second armature; means for connecting the direct current having a constant voltage to the first terminals of said first armature and said second armature; first controllable means for exciting said first field winding, said first controllable means including a first contact connected to a terminal of said first field winding; second controllable means for exciting said second field winding, said second controllable means including a second contact connected to a terminal of said second field winding; means for mechanically coupling said contacts to each other so as to simultaneously increase the excitation of the first field winding and decrease the excitation of the second field winding and vice versa, whereby said circuit carries a direct current having a variable voltage and a power substantially equal to that of the direct current having a constant voltage; and means for reversing the connection of said first field winding and said controllable means exciting the same, whereby said circuit is enabled to feed back power to the device.

GINO TURRINELLI.

REFERENCES CITED

The following references are of record in the file of this patent:

UNITED STATES PATENTS

| Number | Name | Date |
| --- | --- | --- |
| 889,911 | Darlington | June 9, 1908 |
| 1,303,307 | Hellmund | May 13, 1919 |